A. COOPER.
Improvement in Ventilating Roller Window-Blinds.

No. 114,412. Patented May 2, 1871.

Witnesses:
J. H. Phillips
Ellis Drake

Inventor:
Arthur Cooper
by Wiedersheim & Norris
his Attorneys.

United States Patent Office.

ARTHUR COOPER, OF TWICKENHAM, ENGLAND.

Letters Patent No. 114,412, dated May 2, 1871.

IMPROVEMENT IN VENTILATING-ROLLER WINDOW-BLINDS.

The Schedule referred to in these Letters Patent and making part of the same.

*To all whom it may concern:*

Be it known that I, ARTHUR COOPER, of Twickenham, in the county of Middlesex, England, have invented an "Improved Ventilating-Roller Window-Blind;" and I do hereby declare that the following is a full and exact description thereof.

To enable others skilled in the art to make and use my invention, I will proceed to describe its construction, as follows:

This invention relates to roller window-blinds made of Holland, union, or other flexible woven or textile fabric or material, and is designed for the purpose of admitting fresh air into an apartment or room to ventilate it, and at the same time to exclude the entrance of flies, gnats, or other insects into the said apartment or room.

The following is an example of the means by which I propose to accomplish these objects:

I take, for instance, an ordinary window-blind made of Holland, and a few inches from its upper end I cut or divide it across its entire width, and between these divided parts I insert and connect by its edges a piece of open-work material, such as Brussels net or other similar flexible material or suitable perforated fabric.

The blind thus made and combined with a perforated material is fixed on the roller, and rolls thereonto in the usual way.

To use a blind thus made for the purposes of ventilation it is simply necessary to pull down the upper sash of a window a few inches or a foot, then pull down the blind until the perforated part thereof comes opposite to the opening in the window; by these means fresh air may be admitted into a room when the window-blinds are down.

When the blind is not required to be used for ventilation the perforated part is wound on the roller of the blind, and the blind then presents the appearance of an ordinary roller-blind.

I would here remark that I do not intend to limit or confine myself to the use of perforated material inserted as above described; but, if desirable, I leave one or more large openings near the top of the blind for the air to pass through instead of its passing through perforations as previously described. In this case I connect the divided parts of the blind together at a suitable distance asunder by pieces of tape or other material which may be fixed in a line with the upright bars of the window-sash; and In order to explain this invention more fully I now proceed to describe the means by which it may be effected, reference being had to the illustrative drawing accompanying, and to the numeral figures and letters of reference marked thereon, as follows:

Figure 1:
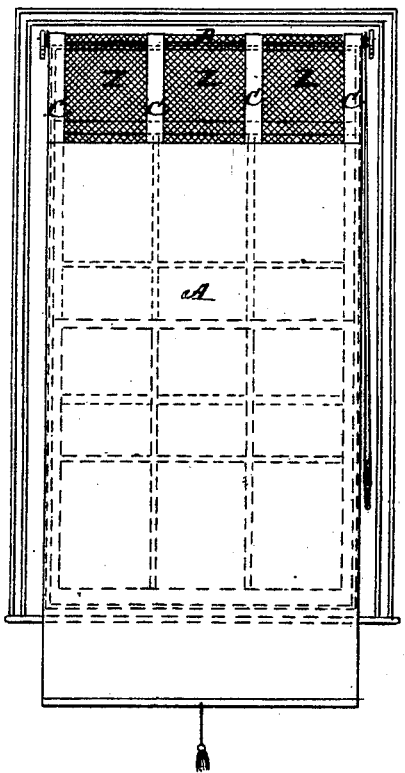
Figure 1 represents an elevation of a window-blind constructed according to this invention, and as it would appear when applied to a window and drawn down so as to admit air into a room.
Figure 2:
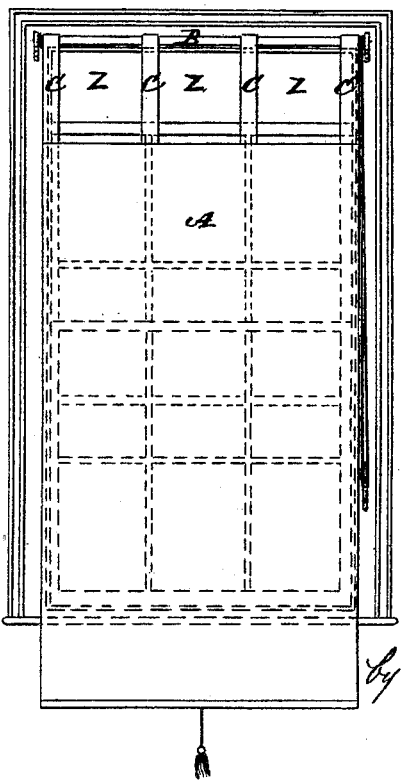
Figure 2 differs from fig. 1 in the following respects: The spaces at $z$ at fig. 1 are covered by a fine net to prevent the entrance of winged insects, in hot climates more particularly.

In cold climates the spaces marked $z$ at fig. 2 are left open or uncovered.

The plain part A of the blind is connected to the roller B by tapes C C, which may be wound on the roller when the blind is not required to be used for the purposes of ventilation.

The drawing shows the top sash of the window drawn down to admit air.

What I claim as my invention, and desire to secure by Letters Patent, is—

Making flexible rolling window-blinds either with perforations or with one or more large openings therein near the top, or any other part of the blind, for the purpose of admitting fresh air into a room and thereby ventilating it when the blinds are drawn down, substantially as above described.

ARTHUR COOPER.

Witnesses:
 WM. T. ORTZEN,
  13 George Street, London.
 H. A. MALLYON,
  85 Gracechurch Street, London.